United States Patent [19]

Genovese

[11] Patent Number: 5,257,048
[45] Date of Patent: Oct. 26, 1993

[54] OPTICAL ELEMENT AND PHOTORECEPTOR REGISTRATION SYSTEM FOR A RASTER OUTPUT SCANNER IN AN ELECTROPHOTOGRAPHIC PRINTER

[75] Inventor: Frank C. Genovese, Fairport, N.Y.
[73] Assignee: Xerox Corporation, Stamford, Conn.
[21] Appl. No.: 17,890
[22] Filed: Feb. 16, 1993
[51] Int. Cl.⁵ .................... G01D 9/42; G01D 15/14
[52] U.S. Cl. ............................... 346/160; 346/108; 359/207; 359/710
[58] Field of Search ............... 346/108, 160; 359/207, 359/710

[56] References Cited

U.S. PATENT DOCUMENTS

| | | | |
|---|---|---|---|
| 4,415,239 | 11/1983 | Humphrey | 359/710 |
| 4,554,560 | 11/1985 | Kanaoka | 346/108 |
| 4,912,491 | 3/1990 | Hoshino et al. | 346/160 |
| 5,153,608 | 10/1992 | Genovese | 346/108 |
| 5,175,570 | 12/1992 | Haneda et al. | 346/160 |

FOREIGN PATENT DOCUMENTS

435640A2 12/1990 European Pat. Off. .

OTHER PUBLICATIONS

Xerox Disclosure Journal, Frank C. Genovese, "Dual Lens Correction and Stabilizing Optics for Scanner Architecture", vol. 17, No. 6 Nov./Dec. pp. 431-432.

Primary Examiner—George H. Miller, Jr.
Assistant Examiner—Randy W. Gibson
Attorney, Agent, or Firm—R. Hutter

[57] ABSTRACT

A system, including a specially-designed optical element, facilitates extremely precise and accurate registration of a light beam on a photoreceptor. The optical element includes a redirecting cylinder lens, having a longitudinal axis oriented obliquely relative to the scan path of the light beam to redirect the light beam. The redirected light beam interacts with an aperture in the photoreceptor to provide an accurate measuring device for the exact position of the aperture with each scan.

15 Claims, 4 Drawing Sheets

OPTICAL ELEMENT AND PHOTORECEPTOR REGISTRATION SYSTEM FOR A RASTER OUTPUT SCANNER IN AN ELECTROPHOTOGRAPHIC PRINTER

The present invention relates to optics adapted to be used in a raster output scanner (ROS) for creating electrostatic latent images from electronic data. More specifically, the invention relates to an optical arrangement for a compact, low-error ROS system suitable for multicolor printing.

Electrophotographic printers wherein a laser scan line is projected onto a photoconductive surface are well known. In the case of laser printers, facsimile machines, and the like, it is common to employ a raster output scanner (ROS) as a source of signals to be imaged on photographic film or an electrostatically charged photoreceptor (a photosensitive plate, belt, or drum) for purposes of printing. The ROS provides a laser beam which switches on and off according to electronic image data associated with the desired image to be printed as the beam moves, or scans, across the charged photoreceptor. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digitally controlling the output of a high speed laser diode or a modulator associated with a continuous laser source. A common technique for deflecting the modulated laser beam to form a scanline across the photoreceptor surface uses a rotating optical polygon with reflecting surfaces; the laser beam from the ROS is reflected by the facets of the polygon, creating a scanning motion of the beam, which is optically focussed to form a sharp scan line across the photoreceptor. A closely spaced regular array of scan lines on a photoreceptor together form a raster of the desired latent image. Once a latent image is formed on the photoreceptor, the latent image is subsequently developed with toner, and the developed image is transferred to a copy sheet, as in the well-known process of electrophotography.

FIG. 10 shows the basic configuration of a scanning system used, for example, in an electrophotographic printer or facsimile machine. A laser source 10 produces a collimated laser beam, also referred to as a "writing beam," 12 which is reflected from the facets of a rotating polygon 14. Each facet of the polygon 14 in turn deflects the writing beam 12 to create an illuminated spot 16 on the pre-charged surface of photoreceptor 18, which in this case is a moving belt. Laser source 10 also includes means for modulating the beam 12 according to image data entered therein. The localized light flux in spot 16 incident at a particular location on the surface of photoreceptor 18, corresponding to a picture element (pixel) in the desired image, discharges the surface for pixels of the desired image which are to be printed white. In locations having pixels which are to be printed black, writing beam 12 is momentarily interrupted through the action of the modulator within source 10, so that the pixel at that location on the surface of photoreceptor 18 will not be discharged. It is to be understood that gray levels are typically imaged in like manner by utilizing exposure levels intermediate between the "on" and "off" levels. Thus, digital data input into laser source 10 is rendered line by line as an electrostatic latent image on the photoreceptor 18.

The rotational motion of polygon 14 results in a spot 16 moving across photoreceptor 18 to form a scan line 20 of selectively discharged areas on photoreceptor 18. At the same time, the surface of photoreceptor 18 is slowly translated at a constant velocity so that the periodic scanning of spot 16 across the moving photoreceptor 18 creates an evenly spaced closely spaced array of scan lines 20, called a raster 22, on the photoreceptor 18, forming the desired continuous image to be printed. One skilled in the art will appreciate that such a configuration will typically further include any number of lenses, mirrors and translational mechanisms to accommodate a specific design.

The accurate location, or "registration," of the latent image on the photoreceptor is an important consideration in the design of a high quality laser imaging system and is particularly critical in color applications. When the latent image on the photoreceptor is developed, and the developed image is transferred to a sheet, such as a sheet of paper, it is not particularly difficult to control its approximate position on the sheet so that it appears centered to the eye. When a portion of the image is cut off by the edge of the sheet, or an unintentional blank space of noticeable size is left on the sheet, position control is obviously unacceptable. In most digital copier and printer designs, the final placement of the transferred image on the sheet directly depends on the position of the latent image on the photoreceptor. Precise registration is particularly important in a color copier or printer where multiple electrostatic latent images developed with different color toners are transferred to a common surface. When the separate colors are superimposed to form a full-color image, the slightest misregistration of the component colors can cause undesirable artifacts to appear that render the print unacceptable. Even when the misplacement is not readily detectable as recognizable color fringes surrounding sharp edges within the image proper, misregistration of the individual colors can cause "color contouring" or "banding" commonly referred to as the "rainbow effect", which are visible moire fringes or spatial interference patterns distributed throughout the image. To avoid these defects, particularly in a color printing system intended for high quality, the position of the laser scan path on the photoreceptor must be very well defined, and the transfer mechanisms capable of providing extremely precise and accurate positioning of the individual color separations in the superimposed output image.

European Patent Application EP-0-435-640-A2 discloses a tandem print engine for use in a color copier or printer, wherein through-holes in a belt photoreceptor are used to admit light therethrough, and the light is detected by sensors in order to determine the starting points for images created on the photoreceptor. Further, this application shows, in FIG. 4, 5, and 11 thereof, arrangements of optical elements, such as mirrors and lenses, for causing the scanning beam to interact with the through-holes.

The article "Dual Lens Correction and Stabilizing Optics for Scanner Architecture," Xerox Disclosure Journal, Vol. 17, No. 6 November/December 1992), pp. 431–432, discloses one application of cylinder lenses and other corrective lenses to enhance registration in a ROS system.

According to the present invention, there is provided an optical element for the transmission of a light beam moving through a scan path, as would be used in conjunction with a ROS and photoreceptor in a scanning system. The optical element, disposed along the scan path, comprises a redirecting lens in the form of a cylinder lens having an axis oriented obliquely relative to the scan path.

According to another aspect of the present invention, there is provided a system for facilitating the registration of the light beam in the scan path on a surface of a belt moving in the process direction. An aperture is defined in the moving belt, and a redirecting lens is disposed at a location along the scan path where the aperture in the moving belt crosses the scan path. The redirecting lens is in the form of a cylinder lens having an axis oriented obliquely relative to the scan path. A photodetector is provided to detect light passing through the aperture and the redirecting lens.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
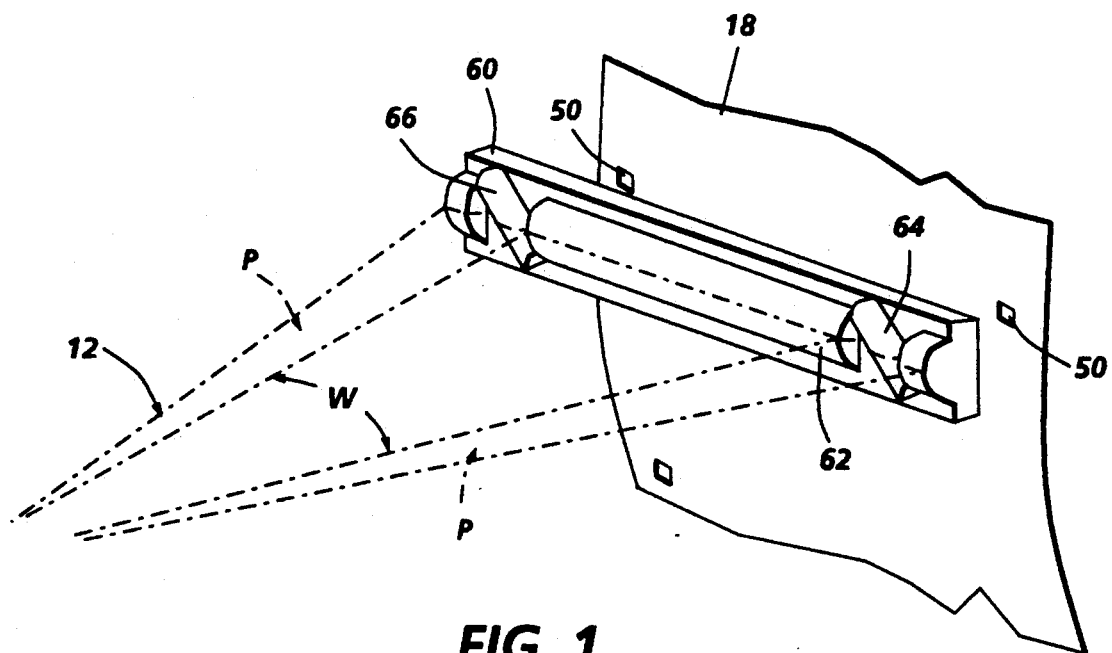
FIG. 1 is a schematic perspective view showing the relevant portions of a raster output scanner incorporating the optical element of the present invention.

FIG. 1 shows the relevant portions of a ROS scan path as they act to create an electrostatic latent image on a photoreceptor belt. Belt 18 has defined therein a number of registration holes, or apertures, each associated with a belt panel and shown as 50. The use of such registration holes is well-known in, for example, the photoreceptors of high-speed printers having multi-pitch photoreceptor belts. The positions of the apertures 50 are fixed relative to the photoreceptor belt 18 itself and serve as reference marks or the datum for accurate placement of the electrostatic latent images to be placed on each panel of the photoreceptor belt 18.

Also shown in FIG. 1 is a writing beam 12, created, for example, by a modulated laser beam and rapidly rotating polygon facets. Thus, although the writing beam itself is shown in FIG. 1 as a generally planar projection in space, the narrow exposure line on the photoreceptor surface is generated by a small spot 16 scanning along a straight path. The rapid intensity modulation of spot 16 traveling across the photoreceptor belt 18 thus creates the scan line of selectively discharged segments, and the juxtaposition of discharging segments of successive scan lines along the moving photoreceptor 18 creates the raster of the desired electrostatic latent image. As can be seen in FIG. 1, the path of spot 16 is here divided into sections according to function. The central section, indicated as W, is the "write" portion in which the desired electrostatographic latent image is generated. On either end of section W are segments extending beyond the electrostatographic portion of photoreceptor belt 18, and labeled as "probe portions" P. The practical difference between the write segment W and the probe portions P of the path of spot 16 is that the intensity of spot 16 is modulated according to image data throughout the portion W, and maintained at constant intensity throughout the P portions of the path. Probe areas P are used with the present invention to provide precise registration of the spot path, and hence the latent image generated within the segment W.

Disposed in front of the photoreceptor belt 18 is an optical element in accordance with the present invention. The optical element generally indicated as 60 permits the transmission of the writing beam 12 therethrough to the surface of the photoreceptor belt 18. Optical element 60 comprises specific sections which are adapted to interact with different portions of the writing beam 12 along its scan path. As an example, in FIG. 1 the central portion of optical element 60, which preferably coincides with the writing portion W of writing beam 12, comprises a main cylinder lens 62. This cylinder lens 62 is adapted to compensate for anomalies in the scan path relative to the direction of motion of the photoreceptor belt 18. To this end, the longitudinal axis of cylinder lens 62 extends perpendicular to the direction of motion of photoreceptor belt 18, and serves to direct the writing beam in a constant straight line relative to the axis of main cylinder lens 62, regardless of, for example, the skew, bow, or wobble that may be present in the writing beam 12. It is to understood that the corrective function provided by cylinder lens 62 may in some system designs be more effective when located elsewhere in the optical train. In such cases the central segment of element 60 corresponding to segment W may be either open space or a transparent window which, generally speaking, can be considered a "cylinder lens" without optical power. As used in the specification and claims herein, the term "cylinder lens," whether applied to the main cylinder lens 62 or any other cylinder lens, shall be interpreted to mean that the lens defines a line of focus parallel to the longitudinal axis thereof; a cylinder lens as used herein need not be in the form of an exactly circular cylinder in cross section, and may or may not include a torroidal component.

In addition to the main cylinder lens 62, there is also provided in optical element 60 and mounted in fixed relation to the main cylinder lens 62, a pair of redirecting lenses shown as 64 and 66. Redirecting lenses 64 and 66 are small cylinder lenses having their longitudinal axes obliquely oriented relative to the scan path. These redirecting lenses 64 and 66 are placed to interact with the probe portions P of the writing beam 12, which are provided at either end of the imaging portion W of beam 12. Further, the redirecting lenses 64 and 66 are also disposed relative to the apertures 50 in photoreceptor belt 18 so that the redirecting lenses 64 and 66 transmit light to the area on the photoreceptor belt 18 where the probe portions of beam 12 intersect with the paths of apertures 50 as the photoreceptor belt 18 moves in a process direction. In this way, the probe portions P of beam 12 will, with each scanning of a line to form the raster, pass through each redirecting lens 64 and 66 and, when an aperture 50 happens to pass through the zone of intersection, be in a position to also pass through portions of the aperture 50.

Each redirecting lens 64 and 66 is adapted to redirect the probe portion P of beam 12 so that part of the scan path of the probe portion P is reoriented to be effectively parallel or substantially parallel to the process direction of the photoreceptor belt 18. That is, the redirecting lenses 64 and 66 cause the portions of beam 12 passing therethrough to be reoriented so that the affected portions of the scan path are made perpendicular to the rest of the scan path. To this end, each redirecting lens 64 and 66 is disposed obliquely relative to the scan path of beam 12. As used in the specification and claims herein, "oblique" or obliquely" shall designate an angle which is generally between being parallel and perpendicular, and is preferably 45°. This oblique orientation of the axis of redirecting lenses 64 and 66 effectively creates a 90° rotation of the scan path of light passing therethrough.

Figure 2:
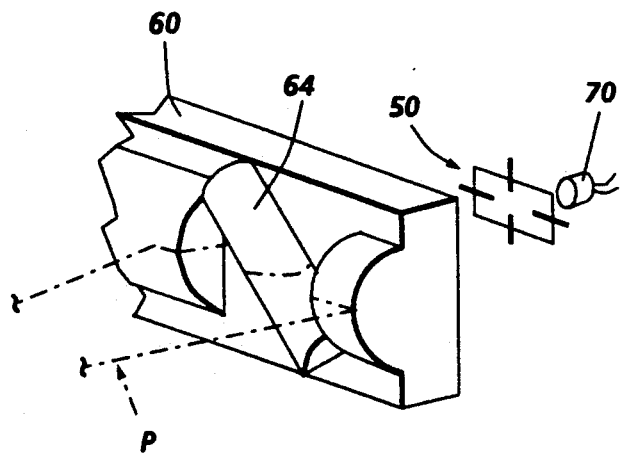
FIG. 2 is an exploded perspective view showing the details of the interaction of a portion of the optical element of the present invention with an aperture in a photoreceptor belt and a photodetector.

FIG. 2 is a detailed view of one redirecting lens 64 at one end of optical element 60, where the probe beam P is shown interacting with the redirecting lens 64. Further, in FIG. 2, an aperture 50 is shown in a position where the scan path of probe beam P intersects the aperture. Simultaneously, there is provided beyond aperture 50 a photodetector of common design, such as a photodiode, shown as 70, positioned to respond uniformly to light flux issued from substantially all portions of the path of beam probe P. Photodetector 70 may include mechanisms such as diffusion screens, collection lenses, or an integration cavity, not shown in the Figures, employed to ensure reasonably uniform response over path P. In FIG. 2, the probe segment P is shown passing through the redirecting lens 64, and then through aperture 50, to be detected by photodetector 70. This situation exists whenever photoreceptor belt 18 is in a position where an aperture 50 passes through the scan path. If a plurality of apertures 50 are provided in the photoreceptor belt 18, the passage of apertures 50 ultimately cause light to be detected by photoreceptor 70, on a periodic basis. Because of the typical relative speeds of the beam 12 and the photoreceptor 18, an appreciable number of scans normally take place during the "time window" in which an aperture 50 is positioned so that light reaches photodetector 70.

Figure 3:
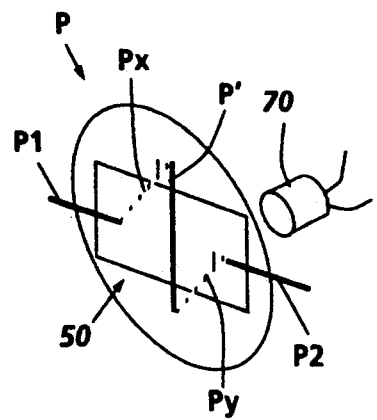
FIG. 3 is an exploded perspective view of the details of the interaction of a redirected probe beam with an aperture in a photoreceptor belt, according to the present invention.

FIG. 3 is a detailed view showing the behavior of probe beam P through one scan, as it is redirected by redirecting lens 64 and intersects aperture 50, which in turn determines the signal detected by photodetector 70. Generally, photodetector 70 is merely a device for sensing the presence or absence of light with high response speed; it is not necessary that photodetector 70 have any other specific optical characteristics. The oblique orientation of redirecting lens 64 causes the path of P to be temporarily reoriented as shown. In FIG. 3, as a result of redirecting lens 64, the path on the surface of the aperture 50 is effectively divided, over time, into distinct segments. The portion labeled P1 is the scan path before the beam strikes the redirecting lens 64. The section labeled P' is the path taken as the probe beam passes through the refractive surface of redirecting lens 64 and is rotated 90° with respect to path P1. When the beam no longer interacts with redirecting lens 64, the scan path is restored to its original path, labeled as P2. The relatively sudden redirection of the probe beam P as it strikes the leading and trailing edges of redirecting lens 64 are manifested in reality as relatively quick "jumps" (discontinuous changes in the scan path), but are understood as changeovers as the probe beam P enters and exits the redirecting lens, and are shown in dotted arrows marked Px and Py, respectively.

It will be noticed that the path of probe beam P, as it moves from the stages P1, Px, P', Py, and P2, causes the scan path to enter the aperture 50 smoothly first from the left-hand side, then from the top, and then to exit the aperture smoothly at the bottom followed by the right-hand side. During this cycle, paths Px and Py represent transitions in which velocity is not specified. In the course of this motion, each edge of the rectangular aperture 50 is crossed with a well defined scan velocity. These scan paths result in the light beam flux being successively detected a number of times by the beam detector 70 as the beam passes the edges of the aperture. The unique signal pattern created by the redirected beam through the aperture 50 and detected by the photodetector 70, can be measured electronically with great accuracy and systematically exploited for purposes of registration.

FIGS. 4–8 represent a series of pairs of time-lapse views comparing, on the left of each Figure, the relative position of aperture 50 in a moving photoreceptor belt relative to the redirected scan path in segment P, here divided into portions P1, P', and P2. The "jump" portions Px and Py, as shown in FIG. 3, are implied. It will be noticed that, in progression from FIGS. 4 to 8, the aperture 50 is moving downward relative to the lines created by probe beam portions P1, P', and P2.

Figure 4:
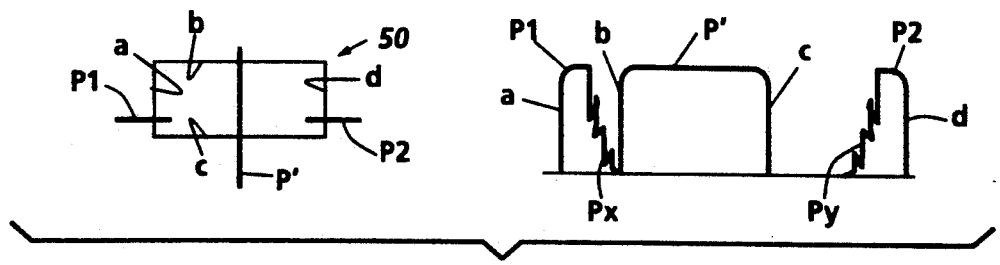
FIGS. 4-8 are a series of time-lapse views showing, on the left side of each Figure, the relative position of an aperture and a photoreceptor belt and the scan path of a writing beam, and on the right side of each figure, the simultaneous signal output of a photodetector associated with the aperture.
Figure 5:
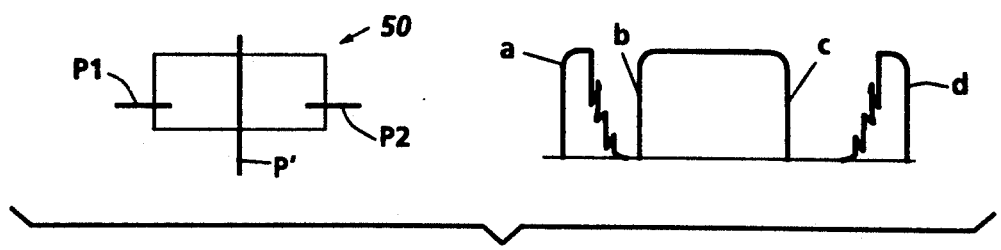
Figure 6:
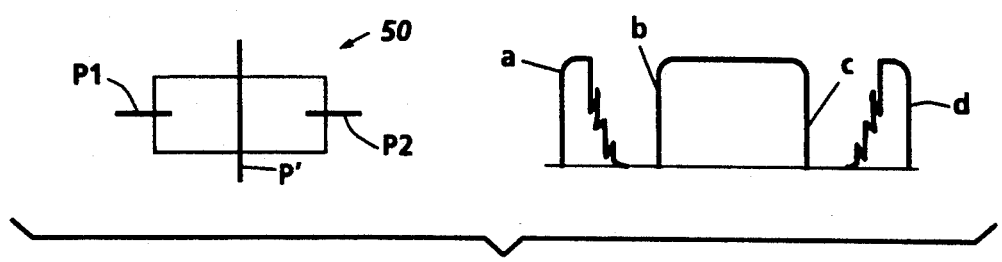
Figure 7:
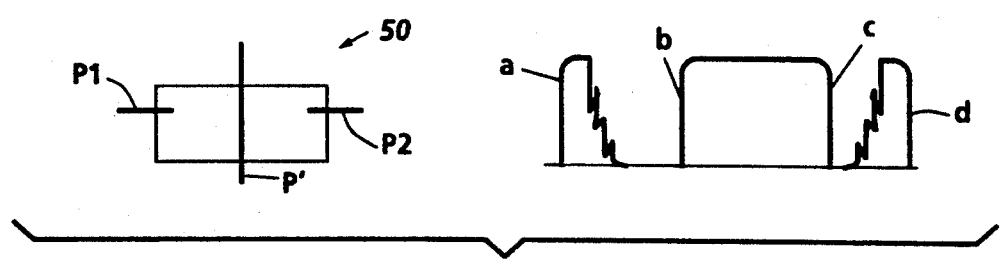
Figure 8:
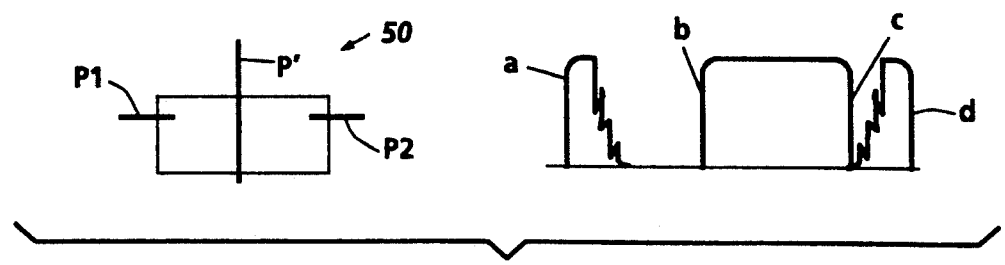

Looking at the right-hand portion of FIG. 4, which shows the behavior in time of a light-dependent signal produced by photodetector 70, it can be seen how the path of probe beam P relative to the aperture 50 creates a distinct pattern in the output from photodector 70. On the left side of FIG. 4, each main edge of aperture 50 is given a unique reference letter, here a, b, c, and d. These edges of aperture 50 have direct counterparts in the outputs of photodetector 70 shown on the right side of FIG. 4. Thus, when the portion P1 of the probe beam crosses aperture edge a, light will abruptly pass through aperture 50 creating a steep rising output transition, marked as a, from photodetector 70. The output will rise to a level marked P1 for that brief period when the light flux from scan path P1 causes a response from photodetector 70. Shortly thereafter, scan path P1 strikes redirecting lens 64, light flux falls outside aperture 50, and the photodetector 70 output returns to 0. The rapid decrease of the signal to 0 labelled Px on the right side of FIG. 4 is shown ragged to indicate that this part of the signal output of photodetector 70 is not well defined. However, once the beam becomes redirected to form beam P', the path of P' passes through the aperture in a controlled way with a well defined velocity, this time moving in a direction parallel (or anti-parallel) to the direction of motion of the photoreceptor belt. The abrupt reappearance of a signal output from photodetector 70 in the form of a steep transition and labeled P' on the right hand side of FIG. 4, occurs when the probe beam P' crosses edge b of aperture 50. The flux is abruptly extinguished with an equally steep transition in the signal output from photodetector 70 when probe beam P' reaches the edge c on the opposite side of aperture 50. Finally, as the probe beam passes out of the active zone of the redirecting lens, and the scan path is reestablished in its normal direction, that is, a path labeled P2 perpendicular to the direction of motion of the photoreceptor belt, photodetector 70 generates a signal output until edge d of aperture 50 is crossed. The final crossing of the scan path at edge d causes the abrupt falling edge transition of the signal marked d on the right side of FIG. 4.

With this general principle in mind, it will be noticed that, in the presence of small increments of the position of aperture 50 relative to the probe beam with each scan due to the photoreceptor motion, the crossing of the probe beam P' of edges b and c of aperture 50 will remain constant in time relative to each other, but will vary in relative timing with respect to the rising and falling transitions caused by the crossing of P1 and P2 at edges a and d, respectively. This relative motion of edges b and c of the signal relative to a and d is evident by a comparison of the relative positions of b and c in the signal as the aperture 50 moves downward in FIGS. 4-8. It will be seen, for example, that the time delay between the crossing of edge a and the crossing of edge b becomes progressively greater, while the time delay between c and d becomes correspondingly less. By using the temporarily redirected probe beam with each scan to precisely determine the exact location of the edges of the aperture 50, extremely precise and accurate registration of latent images created by the writing portion W of writing beam 12 with each scan can be achieved.

In addition to indicating belt position along the direction of travel for timing purposes, the embodiment of the present invention including a pair of redirecting lenses, as shown in FIG. 1, may be employed to indicate the "magnification" of the scan line, that is, the duration of the scan line between aperture pairs carefully prepositioned on opposing edges of the photoreceptor belt, as well as the skew of the scan line measured by the timing difference between like signals from the same aperture pair positioned on opposing edges of the photoreceptor belt. A multiple exposure (color) system where "timing", "scan magnification" and "scan skew" at each exposure station can be determined with respect to a single aperture pair serving as a common reference or datum circulating repeatedly through the system can be configured to provide adaptive feedback so that systematic differences in magnification and skew are automatically eliminated. For example, scan magnification can be normalized by satisfying the requirement that the data rate at each ROS scanner creating a latent image in the write beam W be adjusted so that the number of pixels between the left hand aperture center and the right hand aperture center be identical. The latent images are then fixed in position with respect to the aperture centers. Relative skew can be removed by tilting the ROS housing or other optical elements so that the edges b and c for the left and right datum apertures match at each ROS scanner.

Referring back to FIG. 1, it can be seen that a displacement of the scan line in the process direction due to, for example, a small reorientation of the ROS scanner hardware, shifts the starting and ending points of path P' by the same amount and in the same direction as path segments P1 and P2. As a result, signal transitions b and c (for apertures 50 on either side of photoreceptor 18) take place earlier or later in direct correspondence to the translation of the scan line, such that transitions b and c of the signals are a direct measure of the position of the aperture with respect to the scan line itself. This, of course, assumes that each aperture 50 has been carefully formed so that it is a reasonable facsimile of a well defined rectangle oriented orthogonally with respect to the desired outline of the latent image, or that at least a substantial portion of the aperture outline consists of parallel rectalinear edges. It also assumes that the aperture pair defining the orientation of the leading edges of the plurality of latent images have been carefully positioned so that the datum line between their centers lies at right angles to the general direction of motion of the photoreceptor belt. If this condition is not met, the superimposed color images will be registered to each other but the image will be printed in the form of a parallelogram instead of a rectangle. Thus a plurality of latent images can be precisely positioned in the scan and photoreceptor motion directions, and oriented to be aligned with the fiducial aperture pair solely by reference to the signal outputs generated when the redirected scan beam interacts with the aperture pair.

It is to be understood that the redirecting "lenses" 64 and 66 are so called because of their close resemblance to a cylinder lens in the preferred embodiment. However, the active element may be fabricated using diffractive optics techniques and, in some applications, take the form of a multi-faceted structure when the probe beam path desired is more complex.

Figure 9:
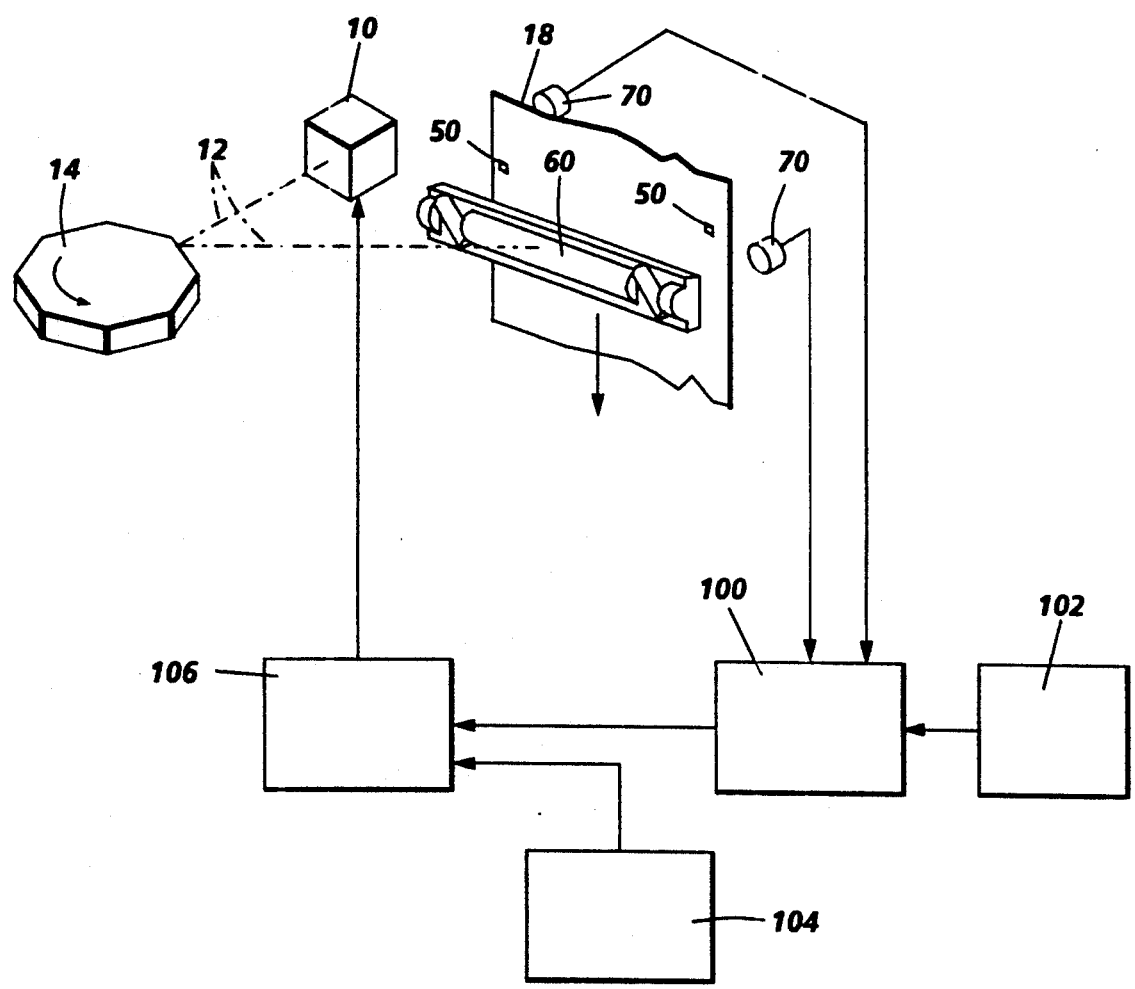
FIG. 9 is a simplified partially schematic perspective view showing the exploitation of the optical element of the present invention to create an extremely accurate and precise electrophotographic printer.
Figure 10:
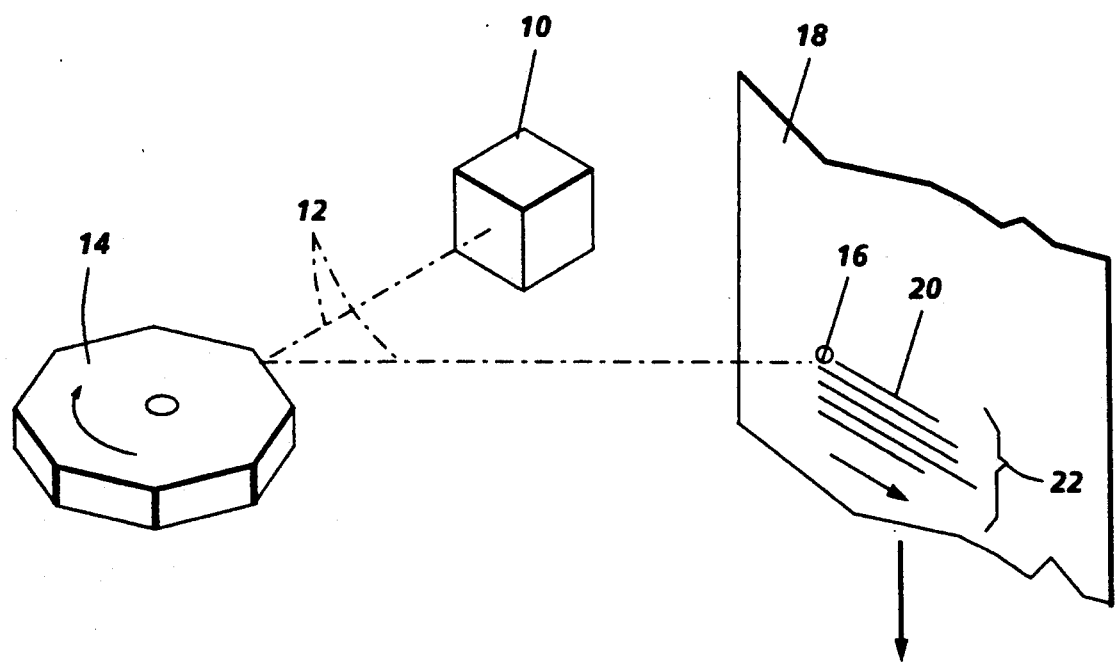
FIG. 10 is a schematic perspective view showing a portion of an electrophotographic printer.

FIG. 9 shows how the optical element of the present invention, and the precise timing of raster scanning that the present invention facilitates, can be implemented in a high-resolution electrophotographic printer having extremely precise and accurate registration. The output signals from each photodetector 70, which, when an aperture 50 in photoreceptor 18 is admitting the probe portion of writing beam 12 therethrough, will have a general appearance similar to one of the signals on the right hand side of FIGS. 4-8, is fed into a timing means generally indicated as 100, which will measure the key parameters of the signal indicative of the precise location of the aperture 50. (In FIG. 9, the arrangement of the two photodetectors 70 is slightly skewed, solely for purposes of showing the general positions of both photodetectors 70 in this two-photodetector embodiment.) One parameter, for example, is the time lag between the crossing of edge a and the crossing of edge b, which will give an accurate measurement of the position of edge b relative to the probe beam P and thus the whole writing beam 12. This accurate timing can be accomplished with the help of an external clock such as 102. Since the aperture or series of apertures will always be in a fixed position relative to the photoreceptor belt 18, a certain position of an aperture 50 can be adapted as a "trigger" to instruct the system to begin outputting data for a particular page to be printed. For example, one possible convention would be that the desired image shall begin to be printed at the precise line at which edge b crosses the scan path of writing beam 12, or some fixed time thereafter. Such adaptations for particular architectures will be readily apparent to one skilled in the art. Thus, the precise timing data from timing means 100 can be coordinated with the digital image data for the desired image to be printed which may enter the system through conventional means, such as an external computer or buffer, shown as 104. The precise timing data from timing means 100 and the desired image data from 104 can thus be coordinated in a raster control means generally indicated as 106, which will control the modulation of the beam emanating from source 10.

In a preferred embodiment of the present invention, the respective lines of focus of the various cylinder lenses in optical element 60 are selected for specific purposes. As the main purpose of cylinder lens 62 is to ensure a proper placement and focus of the write beam W on the actual surface of photoreceptor 18, it is desirable that the line of focus of cylinder lens 62 be set on or very near this surface. However, as the redirecting lenses 64 and 66 come into most use when transmitting light to one or another photodetector 70, it is advantageous if the redirecting lenses 64 and 66 are so shaped and disposed to create lines of focus on the photodetector 70; which is to say the lines of focus of the redirecting lenses are preferably slightly "behind" the photoreceptor 18, because the surface of a photodetector 70 will be behind the photoreceptor 18. Thus, in a preferred embodiment of the present invention, the lines of focus of the redirecting lenses 64 and 66 are located farther from the optical element than the line of focus of cylinder lens 62. This arrangement of the lines of focus can be obtained through shaping of the various cylinder lenses according to techniques known in the art of optics, for example by selecting suitable relative curvatures of the cylinder lens and the redirecting lenses.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An optical element, comprising a main cylinder lens having a longitudinal axis, and a redirecting cylinder lens disposed adjacent one end of the main cylinder lens, the redirecting cylinder lens having a longitudinal axis oriented obliquely relative to the longitudinal axis of the main cylinder lens.

2. An optical element as in claim 1, wherein:
   the redirecting cylinder lens provides a line of focus at a first distance from the optical element;
   the main cylinder lens provides a line of focus at a second distance from the optical element.

3. An optical element as in claim 1, further comprising a second redirecting lens mounted in a fixed position relative to the first mentioned redirecting lens, having a second axis oriented obliquely relative to the longitudinal axis of the main cylinder lens.

4. An optical element, comprising:
   a main cylinder lens having a longitudinal axis,
   a first redirecting cylinder lens mounted adjacent one end of the main cylinder lens, the first redirecting cylinder lens having a longitudinal axis oriented obliquely relative to the longitudinal axis of the main cylinder lens, and
   a second redirecting lens mounted adjacent another end of the main cylinder lens, having a longitudinal axis oriented obliquely relative to the longitudinal axis of the main cylinder lens.

5. A system for positioning a light beam arranged in a scan path on a surface of a belt defining an aperture therein, comprising:
   a redirecting cylinder lens disposed where the aperture in the belt intersects with the scan path, the redirecting lens having an axis oriented obliquely relative to the scan path; and
   a photodetector adapted to detect light passing through the aperture and the redirecting lens.

6. A system as in claim 5 with the belt moving in a process direction, wherein the redirecting cylinder lens is adapted to redirect light in a portion of the scan path so that the portion of the scan path is oriented substantially parallel to the process direction.

7. A system as in claim 5, wherein said belt comprises a photoreceptor surface.

8. A system as in claim 7, further comprising means for creating the light beam and modulating the light beam according to image data, whereby the modulated light beam creates an electrostatic latent image on the photoreceptor surface.

9. A system as in claim 7, further comprising timing means, operatively associated with the photodetector, for monitoring the position of the aperture relative to the scan path.

10. A system as in claim 9, further comprising raster control means, operatively associated with the timing means, for controlling the placement of the electrostatic latent image on the photoreceptor surface by the creating means.

11. A scanning system comprising:
    means defining a surface, the surface being movable in a process direction parallel to the surface; and
    a redirecting cylinder lens disposed adjacent the surface, the redirecting lens having an axis oriented obliquely relative to the process direction, whereby a light beam arranged in a scan path passing through the redirecting cylinder lens and impinging on the surface is redirected so that the scan path is oriented to be substantially parallel to the process direction.

12. A system as in claim 11, further comprising:
    a photodetector adapted to receive at least a portion of light in the scan path passing through the redirecting cylinder lens.

13. A system as in claim 12, further comprising timing means, operatively associated with the photodetector, for monitoring the position of the surface relative to the scan path.

14. A system as in claim 13, wherein the surface comprises a photoreceptor surface, and further comprising means for creating a light beam and modulating the light beam according to image data, whereby the modulated light beam creates an electrostatic latent image on the photoreceptor surface.

15. A system as in claim 14, further comprising raster control means, operatively associated with the timing means, for controlling the placement of the electrostatic latent image on the photoreceptor surface by the creating means.

* * * * *